United States Patent
Kinney et al.

(10) Patent No.: US 7,054,922 B2
(45) Date of Patent: May 30, 2006

(54) REMOTE FIELDBUS MESSAGING VIA INTERNET APPLET/SERVLET PAIRS

(75) Inventors: Thomas B. Kinney, Franklin, MA (US); Serge Miller, Delmar, CA (US)

(73) Assignee: Invensys Systems, Inc., Foxboro, MA (US)

( * ) Notice: Subject to any disclaimer, the term of this patent is extended or adjusted under 35 U.S.C. 154(b) by 867 days.

(21) Appl. No.: 09/993,536

(22) Filed: Nov. 14, 2001

(65) Prior Publication Data

US 2003/0093460 A1    May 15, 2003

(51) Int. Cl.
*G06F 15/16* (2006.01)

(52) U.S. Cl. ...................... 709/219; 709/202
(58) Field of Classification Search ........ 709/201–203, 709/219
See application file for complete search history.

(56) References Cited

U.S. PATENT DOCUMENTS

| | | | |
|---|---|---|---|
| 5,805,442 A | 9/1998 | Crater et al. | |
| 5,847,957 A | 12/1998 | Cohen et al. | |
| 5,850,523 A * | 12/1998 | Gretta, Jr. | 709/224 |
| 5,956,487 A | 9/1999 | Venkatraman et al. | |
| 6,014,612 A * | 1/2000 | Larson et al. | 702/183 |
| 6,151,625 A * | 11/2000 | Swales et al. | 709/218 |
| 6,314,448 B1 * | 11/2001 | Conner et al. | 709/202 |
| 6,424,872 B1 * | 7/2002 | Glanzer et al. | 700/18 |
| 6,564,268 B1 * | 5/2003 | Davis et al. | 710/11 |
| 6,594,530 B1 * | 7/2003 | Glanzer et al. | 700/18 |
| 6,732,191 B1 * | 5/2004 | Baker et al. | 710/1 |
| 6,799,195 B1 * | 9/2004 | Thibault et al. | 709/203 |
| 6,832,120 B1 * | 12/2004 | Frank et al. | 700/65 |
| 2002/0138621 A1 * | 9/2002 | Rutherford et al. | 709/227 |

OTHER PUBLICATIONS

Data Link Layer; Fisher-Rosemount-Fieldbus Tech Overview; retrieved from http://www.frco.com/fr/solutions/fieldbus/techover/dll.html on Jan. 12, 2001.

Fieldbus Message Specification (FMS); Fisher-Rosemount-Fieldbust Technical Overview; retrieved from http://www.frco.com/fr/solutions/fieldbus/technover/fms.html on Jan. 10, 2001.

* cited by examiner

*Primary Examiner*—Jason Cardone
*Assistant Examiner*—Thomas Duong
(74) *Attorney, Agent, or Firm*—Leydig, Voit & Mayer, Ltd.

(57) ABSTRACT

A system and method for remote monitoring and control of a Foundation Fieldbus process network utilizes an applet/servlet pair, the applet residing on a remote node on a wide area network such as the Internet, the servlet residing on a node communicably linked to the wide area network and to the process network. The servlet is operative to collect data via the FMS layer from one or more process devices such as field devices residing on the process network and to have translated the collected data and to transmit the translated data via the wide area network to the applet residing on the remote node. The information is displayed to the user by an appropriate interface such as the graphical interface of a browser running on the remote node. The user may initiate communications by instantiating the applet via a hyperlink in a web page or otherwise, and may input and receive information via the browser's graphical interface.

29 Claims, 7 Drawing Sheets

REMOTE FIELDBUS MESSAGING VIA INTERNET APPLET/SERVLET PAIRS

TECHNICAL FIELD

This invention relates generally to process control and monitoring and, more particularly, relates to the extraction, processing and transmittal of local network process data for remote access via a wide area network such as the Internet.

BACKGROUND OF THE INVENTION

Special-purpose local area networks are prevalent in manufacturing, monitoring, process control, and other industrial environments. Increasingly, such networks are digital rather than analog, due to the increased carrying capacity and ease of set up and maintenance of digital networks. For example, analog networks often require dedicated wire harnesses to each device in the network in a hub and spoke topology, whereas digital networks may take advantage of the increased informational capacity of digital transmission by employing common main lines in a circular or other shared data link arrangement. A network used in the context of an industrial process to control or monitor industrial devices is commonly referred to as a fieldbus network, or simply as a fieldbus.

There exist a number of popular choices with respect to reasonably standardized industrial fieldbus network types, including predominantly DeviceNet, Profibus, and Foundation Fieldbus. DeviceNet is based on the concept of a controller area network (CAN) and is usually configured to interface with fairly simple industrial devices, but may also interface with more complex bus nodes such as controllers. Profibus, and in particular Profibus-DP, is a commonly used digital network standard that facilitates, among other things, real-time communications between devices and device controllers in the network. Profibus-DP employs a master/slave construct and a token-passing method to control access to the bus. Profibus specifications allow for either a copper or fiber optic physical layer. The Foundation Fieldbus standard is another popular choice for industrial process control networks. The Foundation Fieldbus standard, under development by the Fieldbus Foundation, is distinguished by its focus on distributed rather than centralized control of processes encompassed by the digital network. Many digital process networks other than those described above exist as well, including LonWorks, Interbus-S, Seriplex, and CANopen.

SUMMARY OF THE INVENTION

Digital network architectures and standards such as those described above allow communications to varying degrees throughout a local network. However, they do not provide for real-time remote involvement with the local network. That is, a remote manager or other party may wish to observe and use the data exchanged on the fieldbus to become aware of and/or to address immediate concerns. For example, a process manager, whether human or automated, benefits from an ability to monitor the process functions, parameters, or alarm events relevant to the local network, and to communicate with the process entities to modify functions, parameters, etc. If such an entity is at a location remote from the local process network, there is currently no mechanism providing adequate real-time communication between the remote party and existing local network-only entities by integrating existing wide area network technology into a network node.

For example, U.S. Pat. No. 5,956,487 to Venkatraman describes an access mechanism that requires each accessible local area device be made network-aware with respect to the wide area network. Another example set forth in U.S. Pat. No. 5,805,442 to Crater et al is similarly problematic in application. Likewise, a system described in U.S. Pat. No. 5,847,957 to Cohen et al. lacks desirable flexibility and ease of integration.

The present invention provides an architecture and mechanism that facilitates bidirectional access to a local area industrial process digital network over the Internet or other wide area network from a remote location. In particular, an applet/servlet pair is utilized in conjunction with the messaging architecture of the local digital network in an embodiment of the invention to export and import process, device, and control data. As used herein, the term "wide area network" denotes a digital network that is not a local area network. The described architecture and method preferably maintain the security and override systems in place on the local digital network, and provide for remote centralized simultaneous observation of multiple devices or other network data sources. In another aspect of the invention, timeliness of data is assured via a timestamp mechanism. Furthermore, network connectivity between local and remote nodes is monitored via a periodic read, or watchdog, mechanism.

Although the fieldbus incorporated into the examples herein is a Foundation Fieldbus, other digital networks, including those listed above and others, may also be monitored and controlled via a similar mechanism within the invention. In addition, the digital local process network may be a hybrid network, wherein analog networks or branches are employed, through interfaces, in conjunction with the digital network. Such physically active network environments are distinguished from other network types such as passive networks that simply monitor and report observed status of a stock market or the weather and which do not interrelate with a physical industrial process.

Additional features and advantages of the invention will be made apparent from the following detailed description of illustrative embodiments which proceeds with reference to the accompanying figures.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

Figure 1:
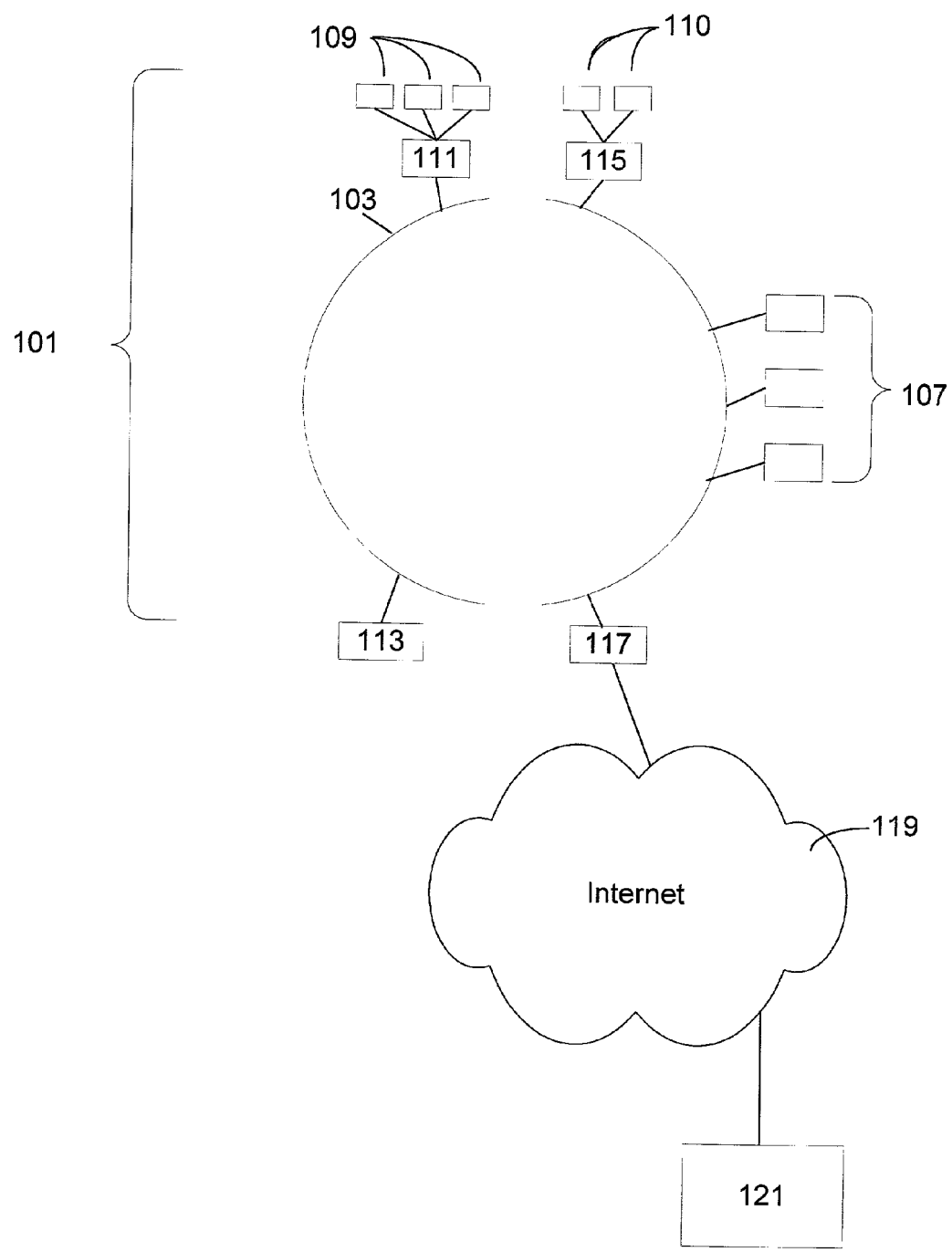
FIG. 1 is a schematic drawing of a process control and computing environment within which an embodiment of the present invention may be implemented.

Turning to the drawings, wherein like reference numerals refer to like elements, the invention is described as being implemented in the context of a process control system incorporating the Foundation Fieldbus protocol. Those of skill in the art will appreciate that the principles of the invention described herein apply equally to other digital industrial process or manufacturing networks. As such, the invention is not limited to implementation within the Foundation Fieldbus standard, but is more widely applicable.

FIG. 1 illustrates a typical industrial process or manufacturing environment 101, collectively referred to hereinafter as a "process environment," and associated digital local process network 103. Typically, the process environment includes controlled process devices such as field devices, which may or may not include control capability. Certain field devices 107 generate digital data for transmission on the fieldbus 103, while other field devices 109 simply generate data signals, such as analog signals, that are converted by a bus node 111 into digital data for transmission on the bus 103. Likewise, control information flows on the bus 103 from a management console 113 or other control stations or a controller 115 or other intelligent bus node, to a controller or field device as appropriate. For example, devices 110 that do not contain control capability can nonetheless be controlled by a controller 115, with the original control instructions either being generated by the controller 115 or sent to the controller via the digital network 103. Other devices can implement control functionality based on control information within the device, established there by a management console 113 or otherwise. Power for bus nodes may be provided by the network 103 itself, or may be externally supplied.

Preferably, the bus 103 contains as a node a computer 117 that is connectable to the Internet 119 or other wide area network via a communications interface, either directly or through an intermediate computer or computers. A remote computer 121, generally residing at a physically remote location, is preferably also connectable to the network 119 via an appropriate communications interface. This computer 121, referred to herein as a remote console or remote host node, is usable by a remote user to remotely access the process network 103, as will be hereinafter described in greater detail. The remote computer is remote in the sense that it is not directly connected as a node in the digital process network 103.

Figure 2:
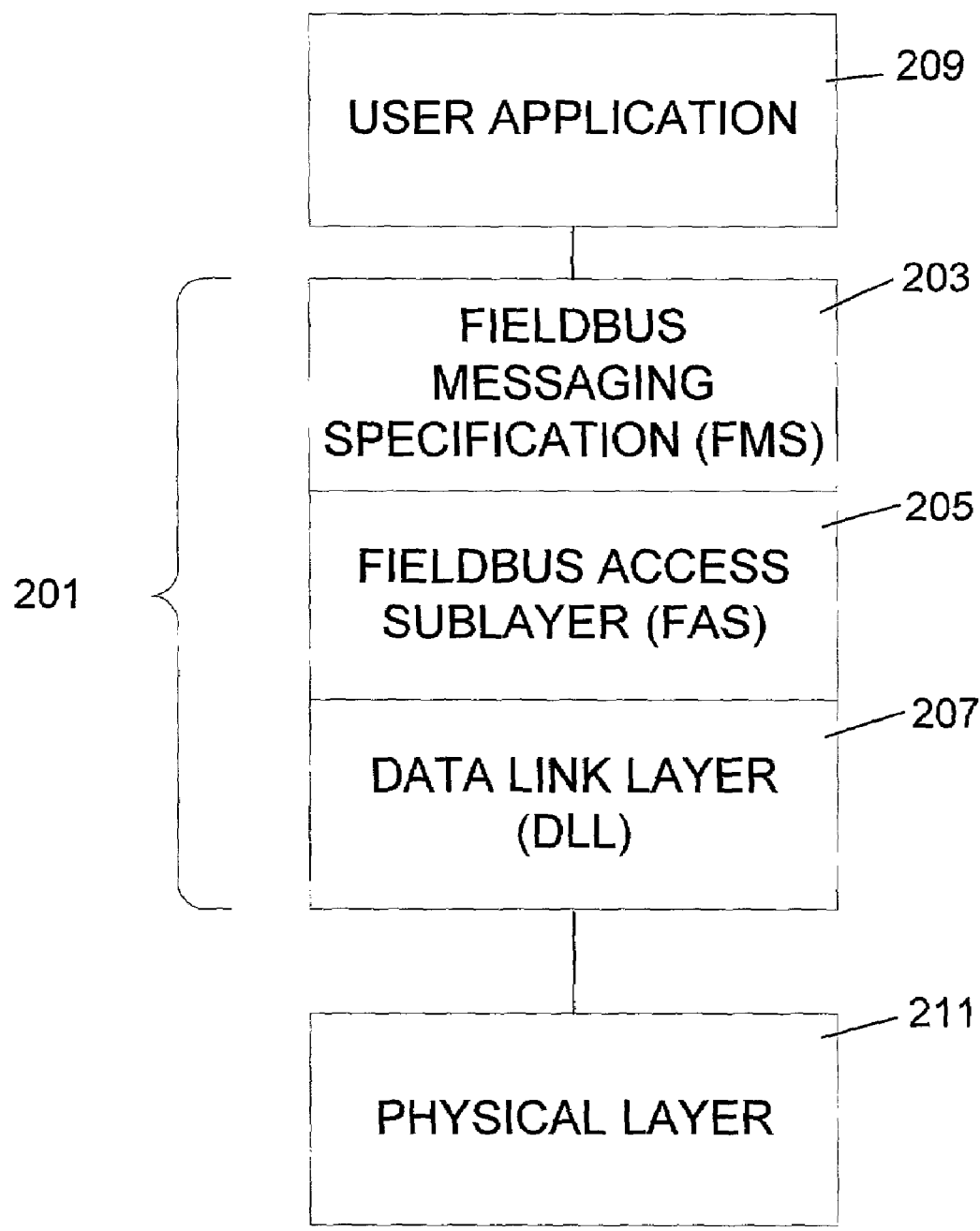
FIG. 2 is a diagram illustrating the layered nature of an exemplary fieldbus communications stack, and the position of the messaging service within the stack, the messaging service being usable in conjunction with an embodiment of the invention.

Illustrated in FIG. 2 is the layer model for the communications stack described by the Foundation Fieldbus standard, arranged to generally follow the OSI seven-layer model where appropriate. Other bus types usable within an embodiment of the invention can use a different layer model, or a non-layered communications stack. As illustrated, the communications stack 201 comprises a Fieldbus Messaging Specification layer (FMS) 203, a Fieldbus Access Sublayer (FAS) 205, and a Data Link Layer (DLL) 207. The stack is in communication with a separate user application layer 209 above and a physical layer 211 below. The application layer 209 communicates with the physical layer 211 using the services of the intervening layers in the communications stack 201. Note that the communications stack 201 does not implement layers 3, 4, 5, and 6 of the OSI seven-layer model. This is because the functions of these layers are generally not necessary in the context of process control.

With respect to the physical layer 211, the Foundation Fieldbus specification implements the IEC 1158-2 and ISA S50.02-1992 standards related to wiring and operational parameters. In particular, the physical layer supports multiple data rates (31.25 kbps, 1 Mbps, and 2.5 Mbps), with devices operating at the lowest rate potentially being powered by the network itself.

The Data Link Layer 207 controls access to the bus (the physical layer 211, depicted as bus 103 in FIG. 1) in conjunction with a Link Active Scheduler (LAS), which is a centralized bus scheduler. The LAS controls bus access for both scheduled (cyclic) and unscheduled (acyclic) transmissions. In the case of scheduled transmissions, such as for executing control loops, the LAS keeps a record of which device is to transmit at what time, and periodically causes each particular device to transmit according to the record. For unscheduled transmissions such as alarm notifications, the affected device must obtain a token from the LAS in order to proceed with transmission. Typically, a particular portion of the Fieldbus should have only one LAS to avoid scheduling conflict and access contention.

The Fieldbus Access Sublayer (FAS) 205 of the communications stack 201 interfaces the Fieldbus Messaging Specification layer 203, corresponding to layer seven of the OSI model, to the Data Link Layer 207, corresponding to layer 2 of the OSI model. The FAS provides various communications functionality, including client/server functionality, publisher/subscriber functionality, etc. Essentially, the FAS 205 provides communication channels, or application relationships, for facilitating communication between application processes.

The FMS layer 203 of the communications stack 201 provides a communications model for interactions between applications over the bus. The primary components of the model include an Object Dictionary (OD) and a Virtual Field Device (VFD). The OD is a structure that defines the format of data transmission on the bus, such as what data types are available and so on. In particular, information transmitted on the fieldbus is described by an "object description," and the OD collects and makes available the various object descriptions in use. The VFDs provided by the FMS layer 203 are used to view local device data which is described in the OD. A device may have multiple VFDs, and in fact will generally have at least two.

The FMS communications services that are generally available provide a mechanism for communication by user applications over the fieldbus. These include services for upload/download of data, programs, etc. over the bus, program invocation services, context management services, object dictionary services, variable access services, and event services.

The services for upload and download utilize a memory domain in a device, and include the following: RequestDomain Upload (used to request upload), Initiate UploadSequence (used to open upload), UploadSegment (used to read device data), Terminate UploadSequence (used to end upload), RequestDomainDownload (used to request download), InitateDownloadSequence (used to open download), DownloadSegment (used to send data to device), and TerminateDownloadSequence (used to end download).

Program invocation services allow for the remote placement and control over the fieldbus of programs in devices. These services include the following: CreateProgramInvocation (allows a bus node to create a program object, possibly to be placed in another device via a download service as detailed above), DeleteProgramInvocation (allows a bus node to delete a program object), Start (allows a bus node to start a program resident in another device), Stop (allows a bus node to stop a program resident in another device), Resume (allows a bus node to resume execution of a program resident in another device), Reset (allows a bus node to reset a program resident in another device), and Kill (allows a bus node to remove a program that is resident in another device).

The context management, object dictionary, and variable access services provided by the FMS 203 are usable to supervise the details of the communication relationships, virtual field devices, and object descriptions in a manner well known to those of skill in the art, and will not be described in detail here.

Entities existing at the user application level may employ the event services provided by the FMS 203 to report and manage events. These services include a service for reporting an event (the EventNotification service), a service for acknowledging an event notification (the AcknowledgeEventNotification service), and a service for enabling or disabling events (the AlterEventConditionMonitoring service). With the exception of the AcknowledgeEventNotification service, these services may take advantage of the "Report Distribution" virtual communication relationship type. As those of skill in the art will appreciate, the FMS communication format conforms to the ASN.1 standard promulgated by the CCITT.

The above description of the various layers and functions of the Foundation Fieldbus are intended solely as an aid to the reader, and are not intended to alter or supplement the pertinent portions of the FFB standard.

In a preferred embodiment of the invention, FMS communications mechanisms such as those described above are utilized as part of a system to provide bi-directional remote real-time communications over the Internet to a computer beyond the local network. Referring again to FIG. 1, the remote computer 121 is connected via the Internet 119 to the digital local process network 103. One or more nodes 117 bridge the process network 103 to the Internet 119. The function and architecture of bridge node 117 as well as other system components will now be described in greater detail.

Figure 3:
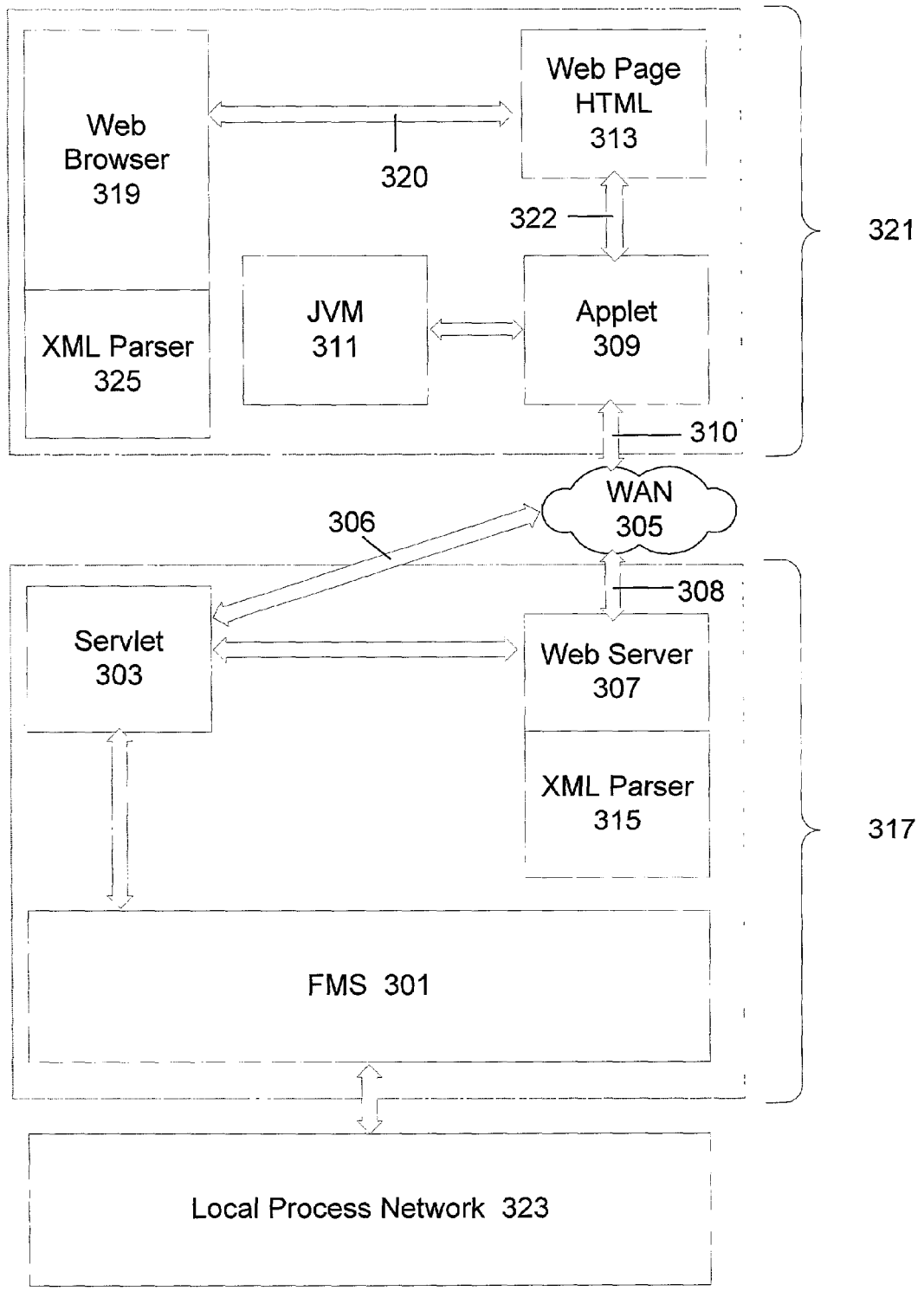
FIG. 3 is an architectural diagram illustrating a remote communications mechanism within an embodiment of the invention.

Referring to FIG. 3, there is shown a communication architecture according to an embodiment of the invention with respect to remote computer 321, also referred to as a remote host node, and local network node 317, also referred to as a local host node. The FMS layer 301 is communicably linked to a servlet 303 residing in the web layer, which is situated analogously to the user application layer defined in the Foundation Fieldbus specification. Although other layers of the FFB model are not depicted, it will be understood by those of skill the art that sufficient layers or functionality are implemented as described above and in the FFB specification to interface the FMS layer 301 to the local process network 323. The communications interface between the servlet 303 and the FMS layer 301 may be fixed or transient, and serves to bidirectionally pass data, commands, etc. The servlet 303, which may be any type of servlet component such as a Java™ servlet, ActiveX™ control, or other program or functional component, is linked to the wide area network 305 such as the Internet through a separate communications stack, or communications interface, and is also connectable to webserver 307. The webserver 307 has access to an XML (Extensible Markup Language) parser component 315.

The communications between the FMS layer 301 and the servlet 303 are preferably in the American Standard Code for Information Exchange (ASCII) format. In contrast, the communications between servlet 303 and the Internet 305 preferably utilize a socket connection 306 using, for example, XML, while the webserver 307 accesses the Internet 305 via a standard Hypertext Transfer Protocol (HTTP) connection 308.

Referring to remote computer 321 of FIG. 3, a web browser 319 with access to an XML parser 325 is linked via connection 320 to a web page 313. The web page 313 is linked via connection 322, in turn to an applet 309, which operates in conjunction with a Java Virtual Machine (JVM) 311 or other mechanism for facilitating execution or running of the applet 309 or the associated native code. Thus the applet 309 is indirectly interfaced to the web browser 319 via the web page 313. Alternatively, applet 309 is interfaced directly or through a different component instead of web page 313. The connection, direct or indirect, between the applet 309 and the browser 319 is referred to herein as an interface.

The applet 309, which may be any type of applet component such as a Java™ applet, ActiveX™ control, or other program or functional component, accesses the Internet 305 by way of an interface 310 that operates as a standard TCP/IP connection that, more particularly, supports both HTTP and socket-oriented communications. Those of skill in the art will appreciate that applets and servlets usable within the invention may be supplied as written in a compiled language such as C++ or an interpreted, scripted, or intermediate language or representation, or may be supplied in machine-specific native code, or otherwise.

Figure 4:
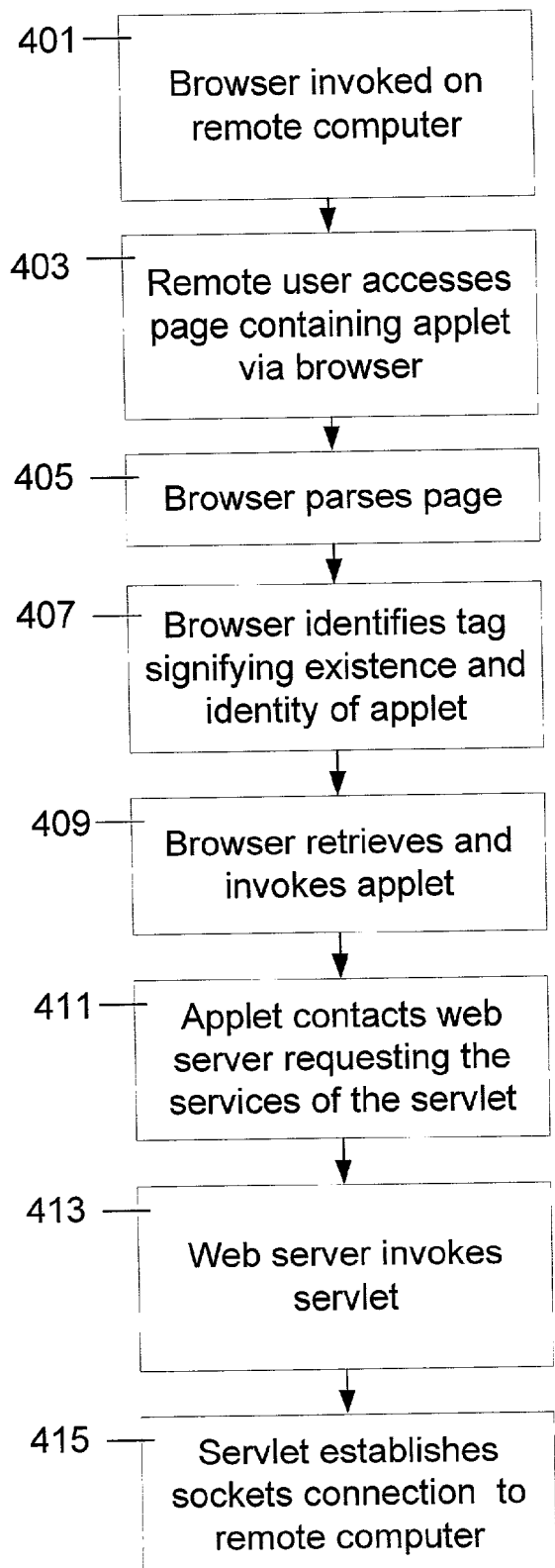
FIG. 4 is a flow chart illustrating the steps executed during setup of communications between a remote and local machine according to an embodiment of the invention.

The flow chart of FIG. 4 illustrates the initial coordinated operation of the foregoing architecture. Because the Internet connection between remote computer 321 and local computer 317 is transient, i.e. it is not a leased or otherwise dedicated permanent physical circuit, a connection is first established between the machines.

At step 401, the browser program 319 is opened in the memory of the remote computer 321 if it is not already running. The browser 319 displays information to the user via a graphical interface, and may also convey information audibly by way of speakers etc. The browser also receives user input via a keyboard, mouse, microphone or other input device. Exemplary browsers usable within embodiments of the invention include Netscape Navigator™ and Microsoft Internet Explorer™. The user accesses a page 313 containing the applet 309, or a link thereto, via the browser 319 in step 403. Such access may be achieved by following a hyperlink from a previous page, such as a general company web page, or the user may type the page address into the appropriate location in a web page or other suitable interface. Regardless, once the browser 319 has retrieved and loaded the page 313, the page 313 being in a browser-readable format such as HTML, the browser 319 parses the page 313 in step 405. After identifying in step 407 an applet tag, embed tag, or other structure signifying the existence and identity of an applet to be run within the page, the browser retrieves the applet 309, if necessary, and opens the applet 309 in step 409.

At this point, a connection is initiated via the Internet 305, an example of a non-local area network. In particular, at step 411, the applet 309 contacts the web server 307 on the local machine 317 via an HTTP exchange over the Internet 305, requesting the services of the servlet 303. The web server 307, in turn, loads and invokes execution of the servlet 303 on the local machine 317 during step 413. At this point, the servlet 303 establishes a socket connection over the Internet 305 to the remote computer 321 in step 415. Note that although an HTTP-compliant exchange was used via the web server 307 to initially establish contact between the machines over the Internet 305, the socket connection 306 provides a relatively long-lived virtual circuit that avoids setup and take down overhead for future data and other exchanges.

Figure 5:
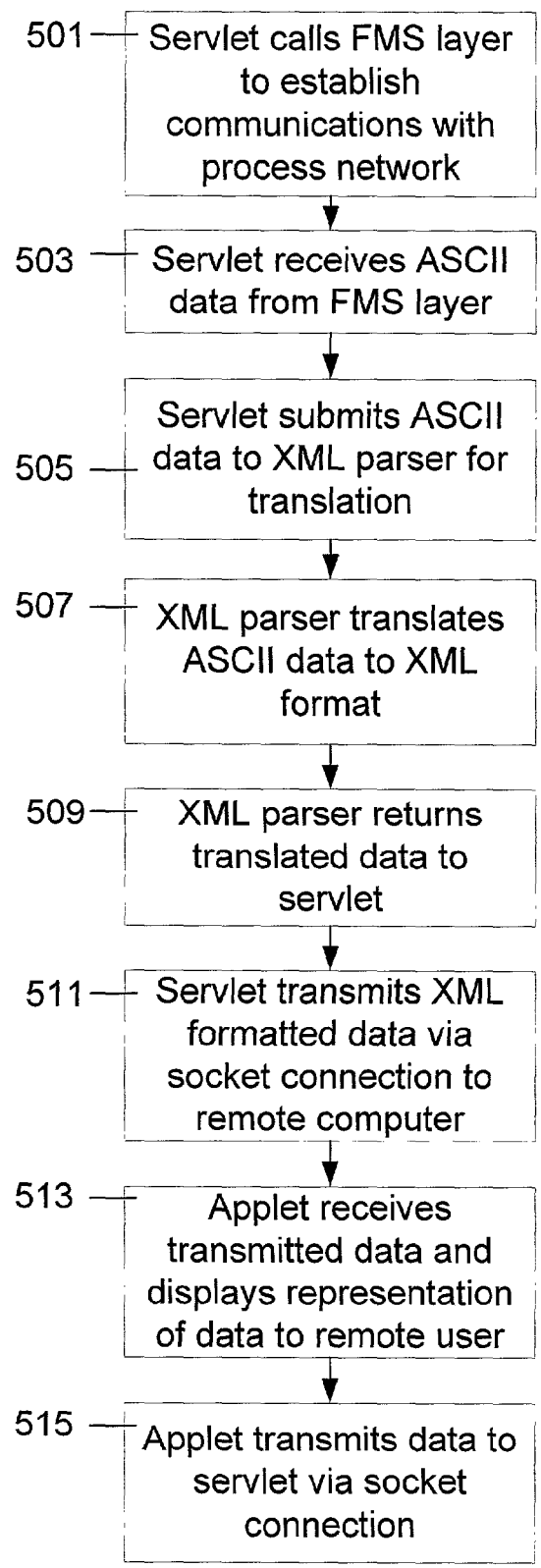
FIG. 5 is a flow chart illustrating the steps executed during operation of the communications architecture between a remote and local machine according to an embodiment of the invention.

The behavior of the system in operation according to an embodiment of the invention is illustrated in FIG. 5. Those of skill in the art will recognize that the timing and sequence of steps during start up and operation are not critical, and also that steps listed as initialization steps in FIG. 4 may alternatively be considered as operational steps, and steps listed as operational in FIG. 5 may alternatively be considered as part of a start up procedure. At step 501, the servlet 303 calls the FMS layer 301 to establish communications with the process network 323. In particular, the servlet 303 instructs the FMS layer 301 to send process data to the servlet 303 and to receive data from the servlet 303. Examples of process data sent to the servlet 303 include process parameters, device information, device status and so on. The information receivable by the FMS layer 301 from the servlet 303 includes control information related to the process on the local process network 323, such as command instructions, set point changes, mode changes, and acknowledgements, as well as information related to the details of the exchanges between the servlet 303 and FMS 301.

There are a number of ways that such exchanges may be structured. For example, the servlet 303 may periodically request process information and updates from the FMS layer 301. Alternatively, the servlet 303 may initially request the FMS layer 301 to transmit certain process information automatically upon the occurrence of some sensed event (e.g. expiration of a timer, violation of a limit, etc.) without receiving further requests from the servlet 303. These two communication models are typically referred to as the client/server and subscriber/publisher models respectively. For potentially rapidly changing data such as process temperature etc., it is preferable to use the subscriber/publisher model so that relevant process information is received in a timely fashion without the overhead and delay caused by repeated servlet requests. For slowly changing or static data such as device identification information, it is preferable to use the client/server model, avoiding unnecessary network traffic and overhead while providing access to the relevant information when it is desired. Thus it can be seen that communications from the applet 309 cause invocation of the servlet 303 and also cause establishment of communications between the servlet 303 and the local network 323 via the FMS layer 301.

Whatever exchange mode is selected and established, the servlet 303 receives data from the FMS layer 301 in step 503, which data the FMS layer 301 has collected from local network devices using known FFB techniques. Typically, as discussed above, this data will be in the form of an ASCII string. In step 505, the servlet 303 submits the received data to an XML parser for translation of the ASCII string to an XML format. After translation, illustrated at step 507, the XML parser 315 returns the translated data to the servlet 303 in step 509. At step 511, the servlet 303 transmits the data over the Internet 305 via the socket connection 306 to the remote computer 321. In step 513, the transmitted data is received by the applet 309 and displayed in the web page 313 by the browser 319 such that the remote user at computer 321 is now timely apprised of process information pertaining to and generated by the distant process network 323. Note that such display need not be graphically within any particular web page, and may indeed appear within a separate window, or may be audible in addition to or instead of being visual. An example of data that lends itself to audible representation is an alarm signal. Any other signal may also be represented audibly by conversion of written words and numbers to spoken words or numbers, as those of skill in the art will appreciate. Thus the conveyance of process and other information to the remote user may take any number of possible forms.

In step 515, the applet 309 optionally transmits data to the servlet 303 via the previously described socket connection 306. This data may be data usable for configuring the connection itself, or it may be information usable for requesting additional data from the network 323, responding to information received from the network 323, or configuring or altering the operation of one or more network devices, etc. For example, the data transmitted to the servlet could be program information for placement and immediate or later invocation on a local process network device, or instructions to start or stop execution of a program on a device, or instructions to alter the mode of a device, and so on.

Those of skill in the art will appreciate that the above-described communications may vary in extent and order. For example, it is not necessary that the applet 309 transmit information after the servlet 303 has transmitted. The order of communications may be reversed, or may include communications from only one party during a particular interval. Thus, in one embodiment the remote user simply watches the incoming real-time data without responding or sending any commands or other communication.

Figure 6:
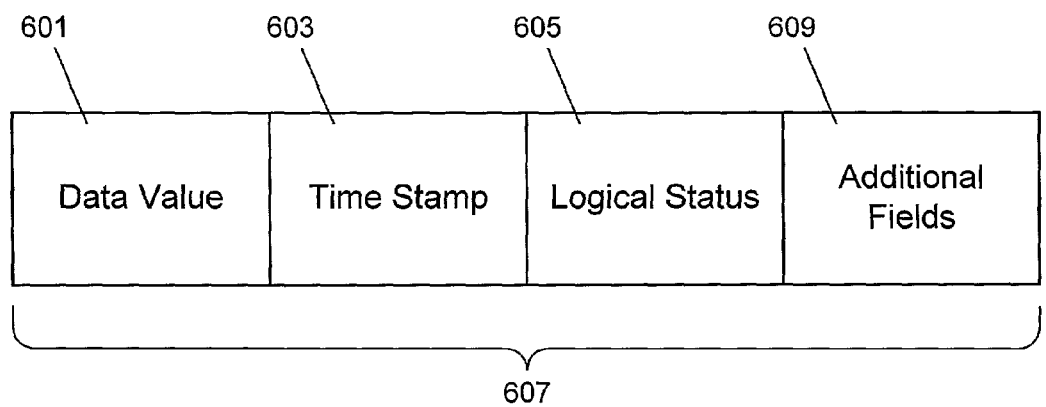
FIG. 6 is a diagram of a packet structure usable to transmit information from a servlet to an applet within an embodiment of the invention.

Communications between the servlet 303 and applet 309 are packetized for transmittal over the Internet 305. An exemplary high level structure usable for many packetized communications from the servlet 303 to the applet 309 is illustrated in FIG. 6. Each packet 607 preferably contains a data value field 601, a time stamp field 603, and a logical status field 605. The data value within the data value field 601 may be any process data available to FMS layer 301, transmitted to FMS layer 301 by a device on the process network 323. Process data is simply data that pertains to the monitored or controlled process. Such data may be for example a process parameter such as a temperature value, flow rate value, valve position or any other process parameter that conveys information regarding the process. Such data can also be, for example, device information such as device capability information or device identity information, or may be device status information such as whether a device is in need of repair or maintenance, etc. In any case, the data value preferably corresponds to information that the remote user desires or needs to be apprised of.

The time stamp value within time stamp field 603 gives an indication of when the data value within the data value field 601 was received by the FMS layer 301. Such a time stamp value may be relative or absolute, although a relative time stamp is preferable in that it eliminates the need to synchronize the clocks of the local node 317 hosting the servlet 303 and the remote machine 321 hosting the applet 309. The logical status information of field 605 is provided by FMS 301 to characterize the data value. For example, the logical status information can characterize the data value as corresponding to an acceptable condition, a positive condition, or a negative condition. Given this characterization, the remote user is able to take appropriate action.

Note that packet 607 preferably contains an additional field or fields 609. The additional fields 609 provide other information necessary for the successful transmission and receipt of the packet. Such information includes network routing information where necessary, such as IP and/or MAC address information as well as any other information needed for proper network communications. The exact additional information needed as well as the manner in which it is presented within the packet depends upon the precise local and wide area network types and topologies employed, as will be appreciated by those of skill in the art.

Figure 7:
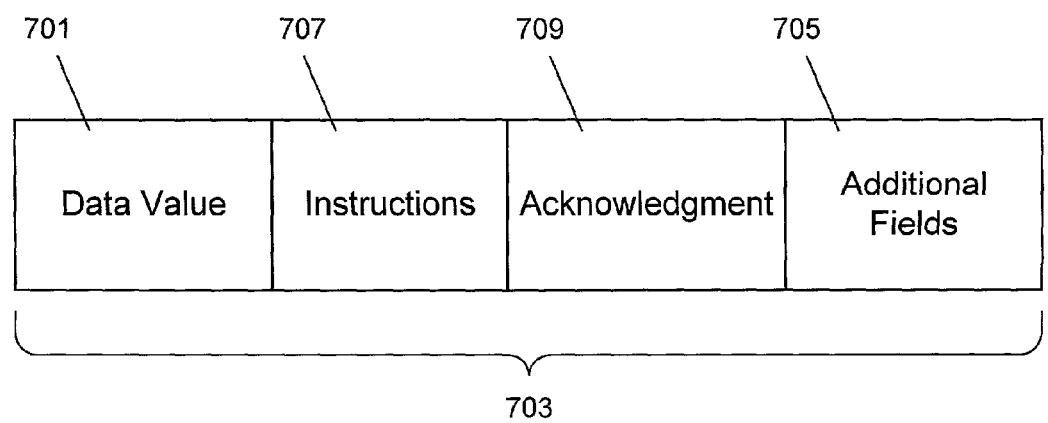
FIG. 7 is a diagram of a packet structure usable to transmit information from an applet to a servlet within an embodiment of the invention.

An exemplary structure usable for packetized communications from the applet 309 to the servlet 303 is illustrated in FIG. 7. A data value field 701 within the packet 703 contains data, such as a set point or other data usable by one or more devices on local network 323. An additional field 707 contains instructions where appropriate, such as to start or stop execution of a certain process or program in a device or with respect to a device using the FMS facilities described above. The packet 703 also contains a field 709 for transmitting acknowledgement information responsive to a prior communication received from the servlet 303 where appropriate.

As with the packet structure for communicating from the servlet 303 to the applet 309, the packet structure illustrated in FIG. 7 also contains an additional field or fields 705. These additional fields contain the information necessary to effectuate transmission and receipt of the packetized information. Note that the additional fields 609 and 705 used according to FIGS. 6 and 7 may vary from each other in order and content according to the local and wide area network types and topologies chosen, as will be appreciated by those of skill in the art. Additionally, it will be appreciated that the various fields illustrated in FIGS. 6 and 7 are presented for exemplary purposes, and fields may be divided, combined, omitted or added as appropriate depending upon the particular network types and topologies employed to carry out the invention, as well as upon the nature of the particular communication being transmitted.

When an embodiment of the invention is used for real time monitoring and/or control of a process, it will often be important for the remote applet 309, and hence the remote user, to receive timely process information. For example, a process alarm that requires user response or action may be untimely if excessive delays occur in either network. Although there are various unavoidable delays inherent in any transmission system, delays that may be controlled are minimized in order to assure the timely delivery of critical information. Thus, for example, the FMS layer 301 preferably retransmits without undue delay any data, commands, instructions, or acknowledgments received from a process device over the local network 323 or from the remote machine 321 over the network 305. The time stamp placed on outgoing packets from the local network 323, discussed above, is examined by the remote machine 321 to independently determine the age, or timeliness, of received information. It is in this regard that synchronized relative clocks on the sending and receiving sides will often be preferable to absolute time keeping. Synchronization messages may be sent with other communications, or may be the subject of separate periodic messages.

Figure 8:
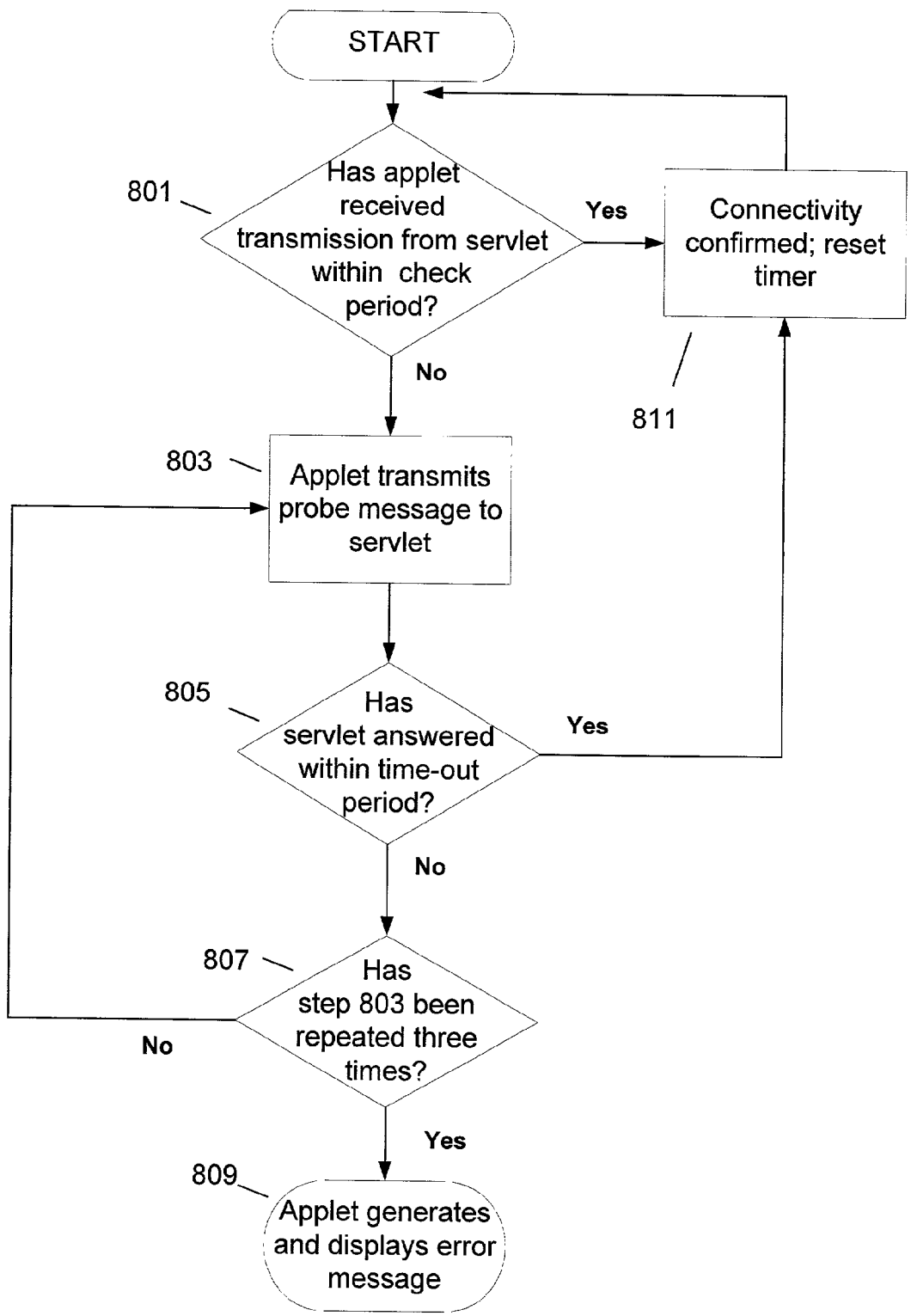
FIG. 8 is a flow chart illustrating a process for detecting a network discontinuity within an embodiment of the invention.

Likewise, in an embodiment of the invention, the applet 309 monitors the state of the socket connection 306 to the associated servlet 303, and informs the remote user at remote machine 321 when a broken connection is detected or unreasonable delay is encountered for whatever reason. This functionality is described hereinafter with reference to FIG. 8.

In this embodiment, the applet 309 preferably tests the connection periodically, such as once per second, when it is not otherwise actively receiving data from the servlet 303. Thus, in step 801, the applet 309 determines, using a timer, whether it has received a transmission from the servlet 303 within a past check period such as one second. If such a transmission was received, then connectivity is confirmed in step 811 and the timer is reset to initiate the next future check. Otherwise, at step 803, the applet 309 transmits a probe message to the servlet 303 via the Internet 305. In one embodiment, the probe message is a request for a device serial number, with respect to a device residing on the local process network 323 associated with the servlet 303.

If it is determined at step 805 that the servlet 303 has returned the requested information within a reasonable timeout period such as one second, connectivity is confirmed at step 811, and the timer is reset to initiate the next future check. If at step 805 it is determined that the servlet 303 has not returned the requested information within the time-out period, it is determined at step 807 whether step 803 has been repeated three times without receiving a response. If not, then step 803 is repeated followed by the steps that logically follow. If at step 807 it is determined that step 803 has already been repeated three times without receiving a response, then the procedure transitions to step 809, wherein the applet 309 generates and displays an error message for the user of remote machine 321. The error message preferably specifies the nature of the error, such as by stating that connectivity to the process network 323 has been lost. The error message may consist of or be accompanied by an audible communication to the remote user.

Those of skill in the art will realize that the check times and time-out periods of one second are exemplary, and that the invention is not limited thereby. Any other suitable period such as 0.5 second, 15 seconds, 30 seconds, etc. may equivalently be used for either or both. The check period and time-out period need not be identical or even similar. Furthermore, the repeat limit for the probe step 803 is also exemplary, and the probe step may alternatively be repeated any other number of times or may occur only once before an error message is generated.

Given the above description, further features of the remote monitoring system corresponding to additional embodiments can now be described. In one embodiment of the invention, it is desirable to use the FMS layer 301 via the local node 317 hosting the servlet 303 to allow monitoring and control of two or more devices within the process network 323. The identities of the devices to be monitored can be specified during the establishment of the connection, or one or both may be added during an active session by conveying the identity of the device and the relevant parameters and/or conditions to be monitored. For example, it can be specified at connection time or during a session that an additional machine with Ser. No. 10987654321 should be monitored with respect to temperature value and alarm conditions. In response, the servlet 303 opens communications, periodic or otherwise as specified, with the indicated machine.

An advantage of an embodiment of the invention is that the hypermedia nature of the wide area network environment 305 is exploited to direct the user of remote machine 321 to a number of resources usable to facilitate process monitoring or control, or to respond to information provided from the network 323. For example, the applet 309 may receive information indicating that a certain device requires maintenance. Within this embodiment, the relevant message contains or is accompanied by hyperlink data corresponding to a source of pertinent maintenance information. The hyperlink data is preferably displayed to the user, who may then activate the link. Alternatively, the applet 309 may directly use the received hyperlink information to access and display the relevant information without user intervention. In the latter case, the information is preferably displayed in an additional window or an additional display area within an existing window in a manner such that it does not substantially obscure information already being displayed to the user.

There are two primary types of security concerns associated with a system that implements a remote monitoring and control mechanism such as described herein. First, it must be initially verified that the remote user is in fact authorized to view and/or change process information or functionality. Secondly, even if the remote user is determined to be authorized, it is preferably assured that the remote user will not accidentally alter the process in a way that would harm the process itself, a process device, or the local process personnel.

With respect to the first concern, it is preferable that the web server 307 be password protected, so that a remote user not in possession of an authorized password will not be granted access to the facilities of the web server 307, including the servlet 303. In this way, an unauthorized user will be substantially prevented from affecting or viewing the operation of the process network. Alternatively, the webserver 307 provides different levels of access to different classes of users, as they are identified by password or otherwise. For example, the access granted may range from passive observation to full remote control of process flow and parameters.

With respect to the second concern, i.e. alteration of the process to inadvertently cause a damaging or dangerous condition, there are two primary types of assurance that may be provided. First, as will be appreciated by those of skill in the art, the FMS layer 301 has certain built in security features pursuant to the FFB specification. These features are generally available to local applications residing above the FMS layer 301, and so may also be used by the remote user via network 305. For example, if the FMS layer 301 receives from the remote user a request to change a device value, and the target device is not in an appropriate mode to respond to the request, the FMS layer 301 will generate and return an error message. The servlet 303 transmits the error message to the applet 309 by the mechanisms described above. Subsequently, the remote user of machine 321 may precede a retransmission of the request by an appropriate mode change request. FMS layer 301 provides additional security measures well known to those of skill in the art that may be exploited in a similar manner in this embodiment.

Additional protection is provided by the servlet 303 in an embodiment of the invention, so that requests or commands that fall outside the scope of certain predetermined limits are effectively intercepted by the servlet 303. Instead of automatically passing along such requests, the servlet 303 preferably generates a response to the remote user of machine 321 indicating the nature of the problem and advising the user that the request will not be executed. In an embodiment of the invention, the servlet 303 preferably also provides an override function so that the remote user is able to force the servlet 303 to allow the request to pass after the user has been apprised of the problem by the servlet 303.

It will be appreciated that a novel process monitoring and control architecture and system have been described herein. In view of the many possible embodiments to which the principles of this invention may be applied, it should be recognized that the embodiments described herein with respect to the drawing figures are meant to be illustrative only and should not be taken as limiting the scope of the invention. Those of skill in the art will recognize that the illustrated embodiments can be modified in arrangement and detail without departing from the spirit of the invention. Therefore, the invention as described herein contemplates all such embodiments as may come within the scope of the following claims and equivalents thereof.

We claim:

1. A method of enabling remote monitoring of a Foundation Fieldbus standard compliant digital local process network by a remote user of a remote host node in a network environment including a plurality of process devices and a local host node residing on the digital local process network, the remote host node being connectable to the local host node via a wide area network, the method comprising the steps of:

invoking execution of a browser on the remote host node;

loading a web page via the browser, the web page containing an applet identifier;

executing on the remote host node an applet corresponding to the applet identifier, wherein the applet is adapted when executed to establish communication between the remote host node and the local host node via the wide area network;

transmitting at least one signal from the remote host node to the local host node, wherein the at least one signal is constructed to cause the local host node to invoke execution of a servlet on the local host node, and further to cause the servlet to receive process data via a Foundation Fieldbus communication stack Fieldbus Messaging Specification layer from at least one of the plurality of process devices and to transmit the received process data to the remote host node via the wide area network and the applet; and conveying information representative of the process data to the remote user of the remote host node via the browser.

2. The method according to claim 1, wherein the wide area network is the Internet.

3. The method according to claim 1, wherein the servlet is a Java servlet and the Applet is a Java applet.

4. The method according to claim 1, wherein the step of conveying information representative of the process data to the remote user comprises the step of displaying process data from two of the plurality of process devices.

5. The method according to claim 1, wherein the process data is selected from the group consisting of device information, device status information, and a process parameter.

6. The method according to claim 1, further comprising the step of inspecting a time stamp at the applet, wherein the time stamp is associated with the transmitted process data, to determine whether the transmitted process data is timely.

7. The method according to claim 1, further comprising the steps of;
 determining whether a transmission has been received by the applet from the servlet within a predetermined check time period;
 transmitting a first probe message from the applet to the servlet if it is determined that a transmission has not been received by the applet from the servlet within the predetermined check time period; and
 determining whether a response to the first probe message has been received by the applet from the servlet within a predetermined time-out period.

8. The method according to claim 7, further comprising the steps of:
 transmitting a second probe message from the applet to the servlet if it is determined that a response to the first probe message has not been received by the applet from the servlet within a predetermined time-out period;
 determining whether a response to the second probe message has been received by the applet from the servlet within a second predetermined time-out period;
 transmitting a third probe message from the applet to the servlet if it is determined that a response to the second probe message has not been received by the applet from the servlet within the second predetermined time-out period;
 determining whether a response to the third probe message has been received by the applet from the servlet within a third predetermined time-out period; and
 determining that network connectivity between the servlet and the applet does not exist if it is determined that a response to the third probe message has not been received by the applet from the servlet within the third predetermined time-out period.

9. The method according to claim 1, wherein the process data is associated with hyperlink data specifying a second web page, the method further comprising the steps of:
 reading the hyperlink data by the browser;
 accessing by the browser the second web page; and
 conveying by the browser to the remote user information corresponding to the second web page.

10. The method according to claim 9, wherein the second web page contains maintenance information regarding one of the plurality of process devices.

11. The method according to claim 1, wherein the step of conveying information representative of the process data to the remote user comprises the step of causing an audible indication to be directed to the remote user.

12. A method of enabling remote monitoring of a Foundation Fieldbus standard compliant digital local process network by a remote user in a network environment including a plurality of process devices and a local host node residing on the digital local process network and a remote host node connectable to the local host node via a wide area network, the method comprising the steps of:
 receiving at the local host node over the wide area network at least one transmission from an applet running on the remote host node;
 invoking execution of a servlet on the local host node pursuant to instructions in the at least one transmission, wherein the servlet resides in an application layer over a Foundation Fieldbus standard communications stack having a Fieldbus Messaging Specification layer;
 obtaining by the servlet process information from at least one of the plurality of process devices, by causing the servlet to communicate with the at least one of the plurality of process devices via the Fieldbus Messaging Specification layer; and
 transmitting the process information over the wide area network by the servlet to the applet, pursuant to instructions in the at least one transmission, whereby a representation corresponding to the process information is conveyed by the remote host node to a remote user.

13. The method according to claim 12, wherein the wide area network is the Internet.

14. The method according to claim 12, wherein the step of transmitting process information further comprises the step of transmitting hyperlink data, whereby the browser uses the hyperlink data to access a second web page containing maintenance information regarding one of the plurality of process devices.

15. The method according to claim 12, wherein the servlet is a Java servlet and the Applet is a Java applet.

16. The method according to claim 12, wherein the step of causing the servlet to obtain process information comprises the step of causing the servlet to obtain process information from two of the plurality of process devices.

17. The method according to claim 16, wherein the process information is selected from the group consisting of device information, device status information, and a process parameter.

18. The method according to claim 12, wherein the step of transmitting the process information over the wide area network further comprises the step of associating a time stamp with the process information, wherein the time stamp is usable to determine the timeliness of the process information.

19. A servlet for residing in a user application layer on a node of a Foundation Fieldbus standard compliant digital local process network to interface the local process network to a remote wide area network node, wherein the local process network comprises a physical layer, the servlet comprising:
 a communications interface to the wide area network, for sending transmissions to and receiving transmissions from an applet residing on the remote wide area network node; and
 an interface between the user application layer and a Foundation Fieldbus standard compliant Fieldbus Messaging Specification layer communicably linked to the physical layer, for sending transmissions to and receiving transmissions from any of a plurality of process devices residing on the local process network, whereby the servlet receives instructions over the wide area network from the applet residing on the remote wide area network node to collect information from any of the plurality of process devices for transmission to the applet over the wide area network.

20. The servlet according to claim 19 wherein the wide area network is the Internet.

21. An applet for running on a first node of a wide area network to interface the first node to a Foundation Fieldbus standard compliant digital process network over the wide area network, the applet comprising:
 a communications interface to the wide area network, for sending transmissions to and receiving transmissions from a servlet residing on a second node on the wide area network, the second node being communicably linked to the process network, wherein the servlet resides in an application layer over a Foundation Fieldbus standard communications stack, and wherein the servlet interfaces with the Foundation Fieldbus standard communications stack via a Fieldbus Messaging Specification layer within the Foundation Fieldbus standard communications stack; and an interface to a browser running on the first node, for sending information to the browser for display to a user and for receiving information representative of user input, whereby the applet receives instructions from the user and in keeping therewith sends a transmission via the wide area network to the servlet, the transmission constructed to cause the servlet to selectively collect information from any of a plurality of process devices residing on the process network and to transmit the collected information to the applet for display to the user.

22. The applet according to claim 21, wherein the wide area network is the Internet.

23. The applet according to claim 21, wherein the collected information is selected from the group consisting of device information, device status, and a process parameter.

24. The applet according to claim 22, wherein the applet is a Java applet and the servlet is a Java servlet.

25. A method of enabling remote interaction with a Foundation Fieldbus standard compliant digital local process network by a remote user of a remote host node, in a network environment including a plurality of process devices and a local host node residing on the digital local process network, the remote host node being connectable to the local host node via a wide area network, the method comprising the steps of:

invoking execution of a browser on the remote host node;

loading a web page via the browser, the web page containing an applet identifier;

executing on the remote host node an applet corresponding to the applet identifier, wherein the applet is adapted when executed to establish communication between the remote host node and the local host node via the wide area network; and transmitting at least one signal from the remote host node to the local host node, wherein the at least one signal is constructed to cause the local host node to invoke execution of a servlet residing in an application layer on the local host node, and further to cause the servlet to transmit information to at least one of the plurality of process devices via the Fieldbus Messaging Specification layer of a Foundation Fieldbus standard communications stack.

26. The method of claim 25, wherein the information transmitted by the servlet to the at least one process device comprises mode information to effect a mode change in the at least one process device.

27. The method of claim 25, wherein the information transmitted by the servlet to the at least one process device comprises program information to effect loading of an executable program onto the at least one process device.

28. The method of claim 25, wherein the information transmitted by the servlet to the at least one process device further comprises a command to invoke execution of an executable program.

29. The method of claim 25, wherein the information transmitted by the servlet to the at least one process device comprises a request for the at least one process device to send data to the servlet.

* * * * *